United States Patent [19]

Areaux et al.

[11] Patent Number: 4,710,126
[45] Date of Patent: Dec. 1, 1987

[54] METHOD AND APPARATUS FOR DRYING METAL CHIPS

[75] Inventors: Larry D. Areaux, Portage; Robert H. Dudley, Richland, both of Mich.

[73] Assignee: Pre-Melt Systems, Inc., Kalamazoo, Mich.

[21] Appl. No.: 866,795

[22] Filed: May 23, 1986

[51] Int. Cl.$^4$ .............................................. F27B 15/00
[52] U.S. Cl. .................................... 432/58; 34/57 E; 432/14
[58] Field of Search ........................... 432/58, 14, 13; 34/57 E

[56] References Cited

U.S. PATENT DOCUMENTS

| | | | |
|---|---|---|---|
| 2,522,342 | 9/1950 | Byers | 432/58 X |
| 4,018,262 | 4/1977 | Jaschinski et al. | 34/57 E |
| 4,089,119 | 5/1978 | Heinze | 34/57 E |
| 4,190,415 | 2/1980 | Singrey | 432/58 |
| 4,480,392 | 11/1984 | Luthi | 432/58 X |

Primary Examiner—Edward G. Favors
Attorney, Agent, or Firm—Gordon W. Hueschen

[57] ABSTRACT

There is disclosed a process for producing dry metal chips by entraining fluid-containing metal chips in a gas, introducing the gas into a cyclone separator having an internal wall heated to fluid-vaporizing temperature by combustion in a surrounding chamber, purging and vaporizing fluid from said chips, exhausting hot gases and exiting dried metal chips from said separator, conducting hot gaseous products of combustion from the combustion chamber to a continuous centrifuge, extracting extractable fluid from starting metal chips in the centrifuge, entraining the chips in the hot gaseous products of combustion introduced into the centrifuge, and conducting the gaseous products with entrained chips from the continuous centrifuge to the cyclone separator, thereby providing an essentially closed system. The combustion chamber may be a part of an afterburner furnace and hot gases entraining vaporized oil exhausted from the cyclone separator may be recycled and employed as fuel for the combustion chamber. Apparatus for carrying out the said process is also disclosed.

34 Claims, 2 Drawing Figures

METHOD AND APPARATUS FOR DRYING METAL CHIPS

FIELD OF THE INVENTION

Preparation of dry metal chips, especially scrap metal chips, illustratively brass and aluminum, for further use, as by reintroduction into a molten mass of metal of which said chips are formed. Drying of said chips by removal of fluid thereon, whether aqueous or organic, e.g., hydrocarbon, in nature, or both. Method and apparatus for so doing.

PRIOR ART

With the value of metal chips, especially brass and aluminum chips, constantly on the increase, and with scrap metal chips now valued at between twenty and fifty cents per pound, the recovery and utilization of metal chips, but especially scrap metal chips, has become more and more advantageous from an economic standpoint. It is today possible to clean metal chips chemically in the presence of a detergent and then vaporize excess water or burn off the oil from chips thermally in a controlled combustion apparatus such as a rotary drum type. This provides essentially dry metal chips when a low order of cost effectiveness can be tolerated or absorbed, but unfortunately essential "dryness" is necessary in all cases in view of the fact that metal chips cannot be employed in a moisture-containing state and hydrcarbon or other cuttingoil fluids adhering thereto must also be removed in order for such metal chips to be capable of reuse. Although such prior-art apparatus and procedure as previously mentioned have been the best available up to the present time, they have proved relatively uneconomic in practice, and other alternative procedure and equipment previously available for carrying out the same have also proved uneconomic and unsatisfactory, especially upon a larger scale such as presently required to meet the demands of industry for larger and larger quantities of chips which can be reclaimed and recycled for further use.

The method and apparatus of the present invention provide long-awaited improvements in both process and apparatus for the removal of either or both of moisture and oily contaminants from metal chips on an economic basis at the very commencement of their reentry into the stream of commerce.

OBJECTS OF THE INVENTION

It is accordingly an object of the present invention to provide a new and improved process for the cleaning of metal chips, especially scrap metal chips, to remove moisture and/or oily residual contaminants therefrom. It is another object of the invention to provide such a process which is economically feasible and in which maximum utilization of energy available from the contaminated chips themselves is employed in the process of cleaning and drying the same. Another object of the invention is the provision of such a process which is particularly adaptable to starting chips which are pre-washed and substantially oil free whereas, in another preferred embodiment of the invention, the process is particularly adapted to the employment of starting chips which have not previously been washed with water plus detergent or the like and which accordingly contain both water and oil residues. Still another object of the invention is the provision of a superior method for the provision of cleaned and dried metal chips suitable for employment in industrial processes whereby scrap metal chips may advantageously reenter the stream of commerce in an advantageous form and under more advantageous economic conditions than previously available. Still an additional object of the invention is the provision of apparatus which is admirably suited for employment in the said process. Yet an additional object of the invention is the provision of a unique combination of apparatus with unique communication conduits or circuitry therebetween which is in turn uniquely and advantageously designed for use in carrying out the process of the invention. Other objects of the invention will become apparent hereinafter, and still other objects will be apparent to one skilled in the art to which this invention pertains.

SUMMARY OF THE INVENTION

The invention, then, inter alia, comprises the following:

In a metal chip drying apparatus, the combination comprising cyclone separator means having inlet means for the entry into said cyclone separator means of gas-entrained metal chips, outlet means for the exit of dried chips from said cyclone separator means, outlet means at the opposite end of said cyclone separator means for the exit of exhaust gases therefrom, combustion chamber means about the outer wall of said cyclone separator means for the combustion of fuel therein, inlet means into said combustion chamber means for the entry of heat and flame thereinto, burner means associated with said inlet means into said combustion chamber means and with fuel source means, and outlet means for exit of gaseous products of combustion from said combustion chamber means; such a combination additionally comprising water-jacket means about said combustion chamber means having cold-water inlet means and hot-water outlet means; such a combination also comprising continuous centrifuge means including chip inlet means and discharge outlet means for exit of gas-entrained chips from said centrifuge means, together with associated conduit means, which associated conduit means is connected from said discharge outlet means to said inlet means into said cyclone separator means; such a combination also comprising conduit means associated with said combustion chamber outlet means and in communication with said chip inlet means of said continuous centrifuge means, thereby forming a circuit between said combustion chamber means through said outlet means thereof and continuous centrifuge means via said chip inlet means of said continuous centrifuge means and thence out of said continuous centrifuge means via said discharge outlet means thereof and associated conduit means into said cyclone separator means via said inlet means thereof; such a combination also comprising rotary airlock means ahead of said chip inlet means into said continuous centrifuge means; such a combination also comprising automatic self-unloading solids separator means at a point in said circuit between said rotary airlock means and said chip inlet means of said continuous centrifuge means; such a combination also comprising rotary airlock means downstream from said dry chip outlet means of said cyclone separator means; such a combination wherein the said combustion chamber means is a part of afterburner furnace means and including return conduit means for conducting exhaust gases from said outlet means of said cyclone separator means into said combustion chamber means; such a combination also comprising rotary airlock means ahead of said chip inlet means of said continuous centrifuge means and also comprising rotary airlock means down stream from said chip outlet means of said cyclone separator means, and such a combination also comprising automatic self-unloading solids separator means in said circuit between said rotary airlock means located ahead of said chip inlet means of said continuous centrifuge means and said chip inlet means.

Also, a process for the production of dry metal chips by the removal of fluid therefrom comprising the following steps:

entraining fluid-containing metal chips in a gas, providing a cyclone separator having a wall, said wall comprising internal and external surfaces, heating a substantial portion of said wall of said cyclone separator to fluid-vaporizing temperature, introducing said gas with entrained fluid-containing chips into said cyclone separator, causing said fluid-containing chips to contact the internal surface of said heated wall of said cyclone separator thereby purging and vaporizing fluid from said chips, exhausting hot gases including entrained vaporized fluid purged from said chips from one end of said cyclone separator, and exiting dried metal chips from the other end of said cyclone separator; such a process wherein said fluid-containing metal chips are moisture-containing metal chips or oil-containing metal chips; such a process wherein said metal chips are moisture-containing metal chips and wherein the internal surface of said wall of said cyclone separator is heated to a temperature sufficient to vaporize said moisture, and including the step of exhausting gases including entrained vaporized moisture from said chips at one end of said cyclone separator and preferably wherein the internal surface of the wall of the cyclone separator is heated to a temperature between about 250° and about 450° F.; such a process wherein said metal chips are oil-containing metal chips and wherein the internal surface of said wall of said cyclone separator is heated to a temperature sufficient to vaporize said oil, and including the step of exhausting gases including entrained vaporized oil from said chips at one end of said cyclone separator and preferably wherein the internal surface of the wall of the cyclone separator is heated to a temperature between about 900° and about 1100° F.; such a process wherein said heating of the wall of the said cyclone separator is effected by combustion in a combustion chamber surrounding said cyclone separator, and such a process wherein said combustion is in a combustion chamber which is a part of an afterburner furnace; such a process wherein said afterburner furnace is fueled at least in part by exhaust gases including entrained vaporized oil purged from said chips in said cyclone separator and including the step of conducting said exhaust gases to said afterburner furnace; and such a process comprising the step of providing a water-jacket surrounding said combustion chamber for purposes of heating water in said water-jacket and conducting said heated water to a chip-washing step at or near the beginning of the process. Moreover, such a process wherein extractable fluid is removed from the starting metal chips centrifugally in a continuous centrifuge before introduction of the gas containing entrained chips into the cyclone separator, and wherein gas entraining said metal chips from said continuous centrifuge is conducted from said continuous centrifuge into said cyclone separator; such a process including the step of utilizing the combustion of exhaust gases including entrained vaporized oil purged from said chips for heating of said wall of said cyclone separator; such a process including the step of exhausting gaseous products of combustion from said combustion chamber and conducting the same to and introducing the same into said continuous centrifuge for the heating and entrainment of starting metal chips therein; such a process wherein the temperature of the gaseous products of combustion conducted to said continuous centrifuge from said centrifugal separator is between about 220° and about 300° F. for water-containing chips and between about 450° and about 750° F. for oil-containing chips. Finally a process for the production of dry metal chips by the removal of fluid therefrom comprising the following steps: entraining fluid-containing metal chips in a gas, providing a cyclone separator having a wall, said wall comprising internal and external surfaces, heating a substantial portion of said wall of said cyclone separator to fluid-vaporizing temperature, introducing said gas with entrained fluid-containing chips into said cyclone separator, causing said fluid-containing chips to contact the internal surface of said heated wall of said cyclone separator thereby purging and vaporizing fluid from said chips, exhausting hot gases including entrained vaporized fluid purged from said chips from one end of said cyclone separator, and exiting dried metal chips from the other end of said cyclone separator, heating said wall of said cyclone separator to fluid-vaporizing temperature by effecting combustion in a combustion chamber surrounding said wall of said cyclone separator, conducting the hot gaseous products of combustion from said combustion chamber to and introducing them into a continuous centrifuge, extracting extractable fluid from starting metal chips centrifugally in said continuous centrifuge, entraining said metal chips in said hot gaseous products of combustion introduced into said continuous centrifuge from said combustion chamber, and conducting said gaseous products with entrained chips from said continuous centrifuge to and introducing the same into said cyclone separator, thereby providing an essentially closed system; such a process wherein said chips contain oil and wherein said combustion chamber is a part of an afterburner and wherein the hot gases include entrained vaporized oil and are exhausted from said cyclone separator and recycled back and employed as fuel for said combustion chamber of said afterburner furnace; and such a process as previously described wherein the process is conducted in an essentially non-oxidizing atmosphere.

THE DRAWINGS

Reference is now made to the drawings, wherein.

DETAILED DESCRIPTION OF THE INVENTION

The present invention, in both its method and apparatus aspects, will be more readily understood from the following detailed description, particularly when taken in conjunction with the drawings, in which all of the significant parts are numbered and wherein the same numbers, or numbers differing by 100, are used to identify the same parts throughout.

Figure 1:
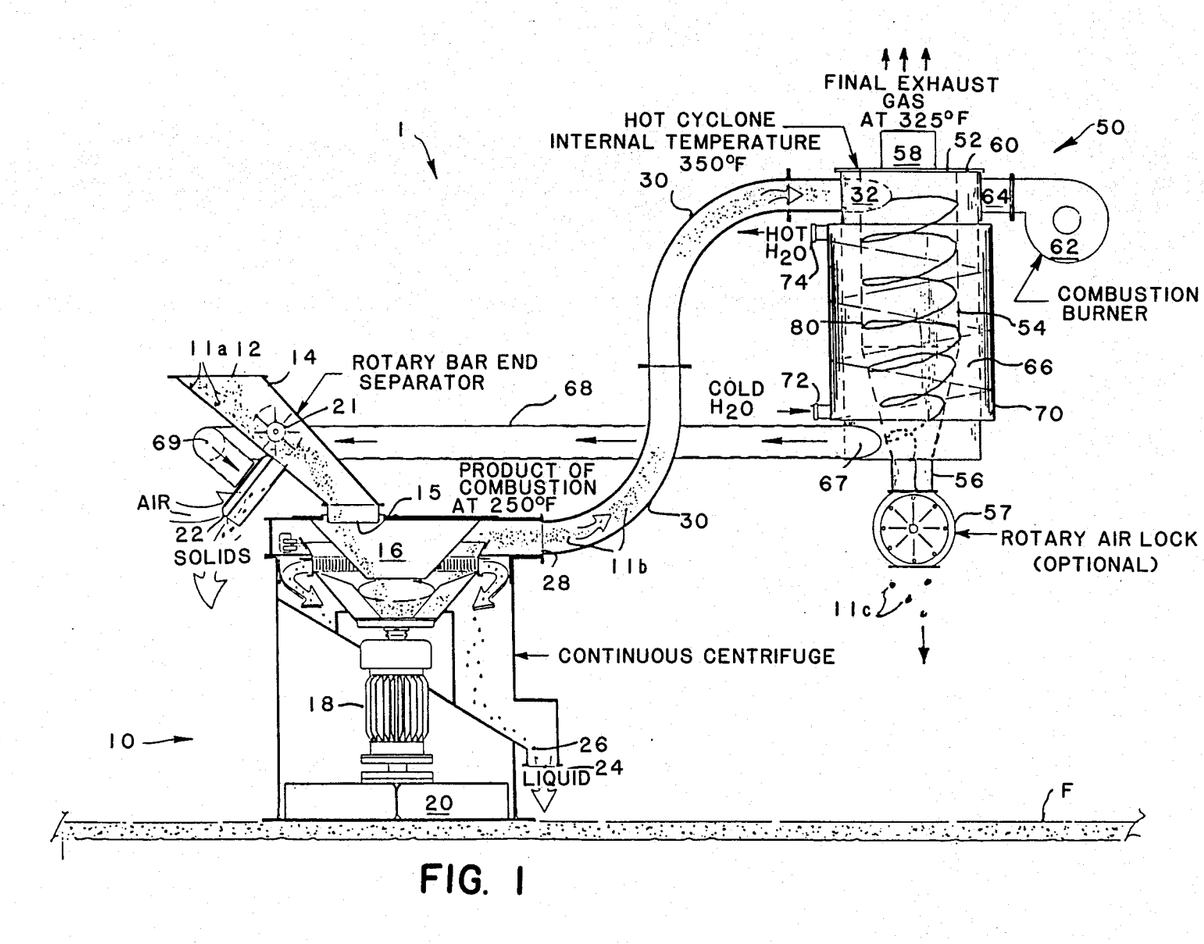
FIG. 1 is a side elevational view of apparatus according to the invention which may be employed in carrying out the method of the invention shown partially schematically and partially in section for purposes of convenience and simplicity.

In FIG. 1 is illustrated apparatus and process uniquely designed for the production of dried metal chips which have been pre-washed. At the left of the drawing, unwashed chips 11 (not shown) are subjected to washing in a usual washing unit for the washing of metal chips with hot water and detergent or the like which contain in addition the normal oil, dirt, and other debris ordinarily associated with such chips, especially of the scrap metal variety. The washed and preshredded chips 11a are introduced into chip entry means 12 of continous centrifuge or wringer unit 10 such as Reclamet models having particular adaptability to the removal of moisture and/or oil from the surface of metal chips including their models TD3000, TD4000, and TD5000, shown generally at 10. Chip entry means 12 leads into inclined duct 14 emptying into the usual spinning bowl 16 for centrifugal separation of fluids from chips to the extent possible in such a device. Centrally of inclined duct 14 is located rotary bar end separator 21 which doubles as an airlock under usual operating conditions. Communicating with inclined duct 14 is air intake and solid separation exit 22, in close juxtaposition to rotary bar end separator and airlock 21 to permit air to enter the wringer unit because of the suction or vacuum created therein while, at the same time, permitting bar ends or parts larger than a prescribed maxiumum to leave the inclined duct 14 as directed by rotary bar end separator 21 to exit 22.

The usual spinning or centrifugal bowl 16, for centrifugal separation of liquids from solids in the heated continuous centrifuge unit 10, is rotated by associated drive means 18 mounted on base 20 which in turn is situated upon floor F. Liquid 24, in this case consisting essentially of water or aqueous detergent solution with substantially no oil, which is wrung out of the chips by the continuous centrifuge unit, exits therefrom via chip wringer exit 26 whereas the wrung chips 11b, still carrying entrained moisture and whatever other liquid not wrung therefrom in continuous centrifuge unit 10, in an amount of approximately two (2) percent by weight, exit said unit via exit pipe 28 and enter, along with entraining gases, essentially steam, an entry conduit 30 communicating with separatory unit entry means 32.

The cooperating heated separatory unit, shown generally at 50, comprises cyclone separator proper 52 having an external wall 54 and surrounding combustion chamber 66, of mild or stainless steel or the like, which is in turn surrounded by an external water jacket 70, possibly glass or otherwise lined, as is conventional in the art of water-jacketing. The external water jacket 70 has a cold water inlet 72 and a hot water outlet 74, from which hot water may conveniently be conducted back to the chip-washing unit (not shown) at the very beginning of the process. Combustion means 60 comprises combustion chamber 66 surrounding cyclone separator external wall 54 and combustion burner 62, fueled with oil or gas from a source not shown, and communicating via hollow burner mounting means 64 with internal combustion chamber 66 for directing heat and flame thereinto.

Upon entry of wrung chips 11b entrained in gases (mainly steam) via separation unit entry means 32, solids comprising wrung chips 11b follow spiral path 80 internally in contact with and along the hot wall 54 of separator 52 wherein and whereby they are dried by their contact with the internal surface of separator external wall 54, which is heated by internal combustion chamber 66 surrounding said separator wall 54 to a temperature of about 350° F., and finally pass out of said separator 52 via separator solids exit means 56 and through optional but preferred rotary airlock 57 as clean and dry chips 11c for collection and reuse.

Final exhaust gases, at or about 325° F., pass out of the separator unit at the top thereof via separator gas exit means 58 and may be allowed to escape to the atmosphere or be captured and disposed of in an afterburner or baghouse or the like if desired. (cf.1 in FIG. 1)

Simultaneously, products of combustion from combustion chamber 66 in the combustion means 60 surrounding separator wall 54 pass out of said combustion chamber via exit means 67 at a temperature of approximately 250° F. and are conducted through combustion chamber exit conduit 68. The hot combustion gases then enter inclined duct 14 of the continuous centrifuge unit 10 through gaseous combustion product entry and return means 69 from which point they are drawn with chips via chip inlet 15 into the continuous centrifuge unit 10 by means of the considerable vacuum or suction provided therein. Hot gas entry and return means 69 feeds into air intake and solids separation exit 22 which in turn leads directly into duct 14 of continuous centrifuge unit 10. Upon entering into duct 14 and spinner bowl 16, the gaseous products of combustion resulting from the combustion effected in combustion means 60 assist in the vaporization of fluid materials carried by the starting metal chips 11a and finally exit centrifuge unit 10 at exit 28 along with wrung chips 11b.

Figure 2:
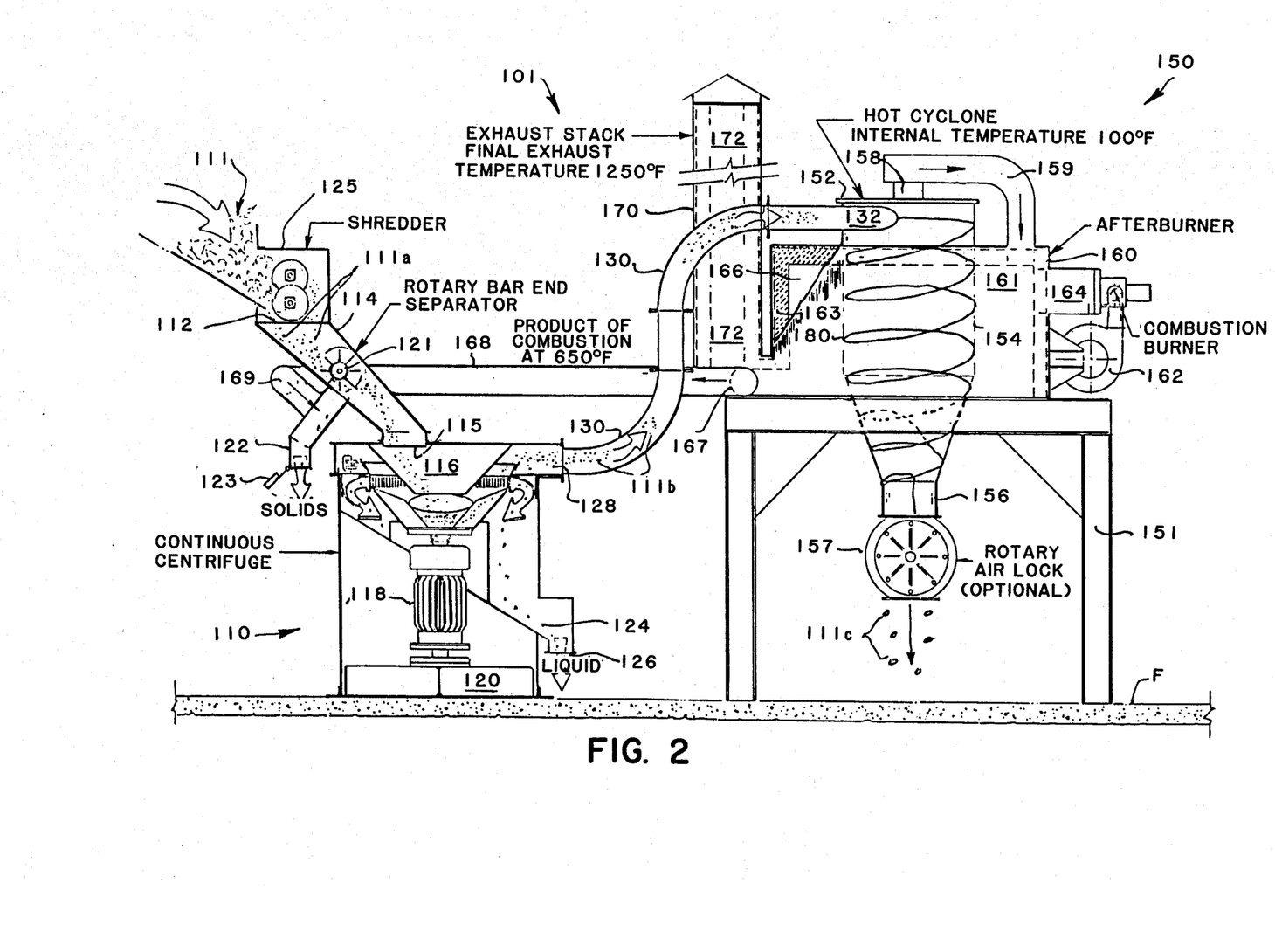
FIG. 2 is a side elevational view of another embodiment of apparatus according to the invention which may be employed in carrying out another embodiment of the method of the invention, once again being shown partially schematically and partially in section for purposes of convenience and simplicity.

In a second embodiment of the invention, as illustrated in FIG. 2, the metal chips subjected to the process and apparatus of the invention are previously unwashed chips, containing residual moisture and oil. For this reason provision is not made for the procurement and utilization of hot water, as in the embodiment of FIG. 1, but economic and other factors may dictate the selection of the previously-described embodiment, or vice-versa, since more drastic energy measures and greater capital outlay are required for the drying of chips which have not previously been subjected to a washing process.

In FIG. 2, the heated separator unit is shown generally at 150, the heated continuous centrifuge or wringer unit at 110, and the entire combination of apparatus at 101.

As shown in FIG. 2, unwashed chips 111, replete with the usual moisture, oil, dirt, and other associated debris, pass along inclined duct 114 leading into the usual centrifugal or spinner bowl 116 after having entered at chip entry means 112 following subjection to a shredder 125, illustratively a high-torque low-speed hydraulically-driven turnings shredder such as Premelt Shredder Model 2436 from Premelt Systems, Inc., Kalamazoo, Mich., USA. As shredded chips 111a proceed in inclined duct 114 they contact rotary bar end separator 121 which doubles as an airlock under usual operating conditions. Airlock 121 again cooperates with solids separating exit 122 to direct bar ends and metal chips above a predetermined maximum size to exit from the inclined trough 114 prior to entering into the centrifuge proper at chip inlet 115, exit 122 being monitored by weighted damper 123 which opens when the separated solids collected at exit 122 reach a predetermined minimum for temporary opening of the damper. Spinner bowl 116 is again rotated by associated drive means 118, once again mounted on base 120 in turn situated upon floor F. The concentration of residual liquid on chips 111b upon leaving centrifuge or wringer 10 is approximately two (2) percent by weight, most of which is oil of a hydrocarbon or other combustible nature.

Once again the continuous centrifuge unit shown generally at 110 is, as shown, associated with separation unit shown generally at 150. Separation unit 150 comprises cyclone separator proper 152 including cyclone separator exterior wall 154 and separated solids exit means 156 through which separated solids exit via optional but preferable rotary airlock 157. At the top of cyclone separator 152 is separated gas exit 158 through which hot gases exit from the separator 152. Metal chips 111b entering the cyclone separator 152 follow spiral path 180 in contact with the interior surface of heated cyclone separator exterior wall 154 en route to separated solids exit means 156.

Surrounding separator 152 is afterburner furnace 160 comprising an external housing 161 of mild or stainless steel or the like, as is conventional in the furnace art, which houses an internal combustion chamber 166 surrounding the cyclone separator exterior wall 154. The external housing 161 of the afterburner furnace 160 is provided with a refractory lining 163, as is also conventional in the furnace art. Combustion burner 162, fueled with oil or gas from a source not shown, provides heat and flame directed into internal combustion chamber 166 via hollow burner mounting 164 whereby burner 162 is mounted upon external housing 161 of afterburner furnace 160 and through which mounting burner 162 communicates with the internal combustion chamber 166. Hot exit gases leaving cyclone separator 152 via gas exit means 158, in this embodiment comprising vaporized hydrocarbon and other combustible oils, are cycled by separated gas return conduit 159 communicating with internal combustion chamber 166 back into combustion chamber 166 where they provide suitable fuel for the afterburner furnace 160.

The metal chips 111b entering the cyclone separator 152 via entry means 132 from entry conduit 130 are heated to an extremely high temperature of approximately 1000° F. during their passage through cyclone separator 152 while describing spiral path 180 along and in contact with the interior surface of extremely hot exterior wall 154 of separator 152, finally passing out of separator solids exit means 156 and through optional but preferably rotary airlock 157 from which the cleaned and dried chips 111c exit and may be recovered for further use.

The entire separator unit 150, as shown, including cyclone separator proper 152 and afterburner furnace 160 and associated conduits, along with combustion burner 162, are all supported on support means 151, in turn mounted upon floor F.

The hot gases, which are products of combustion of the combustion which takes place in the combustion chamber 166 of afterburner furnace 160, are led from internal combustion chamber 166 via combustion chamber exit means 167 into combustion chamber exit conduit 168 where the products of combustion in gaseous form at a temperature of approximately 650° F., controlled if necessary by employment of dilution air, finally enter inclined duct 114 via hot gas return inlet 169, which communicates with separated solids exit 122, whereupon they are conveyed into the continuous centrifuge or wringer unit 110 together with chips 111a entering from shredder 125 past rotary bar end separator 121 and along inclined duct 114 to assist in the drying of the new batch of chips 111a in the continuous centrifuge or wringer 110 and the spinner bowl 116 thereof into which the hot return gases and chips are suctioned via chip inlet 115 by means of the vacuum created therein.

A controlled portion of the products of combustion exiting from the combustion chamber 166 after leaving combustion chamber exit means 167 is vented to the atmosphere through exhaust means in the form of exhaust stack 170 via flue 172 communicating with combustion chamber exit means 167, the final exhaust temperature of those products exiting through exhaust stack 170 being on the order of 1250° F. It will be understood by one skilled in the art that the height of the exhaust stack must be sufficient, e.g., 20 or 30 feet, to cause an upward flow of gases sufficient to create a negative pressure or natural draft on the products of combustion exiting the combustion chamber through exit 167 or, alternatively, that such negative pressure or natural draft can be established by use of an exhaust fan (not shown).

As will be apparent to one skilled in the art although, in the first embodiment of the process of the invention as illustrated in FIG. 1, where the object is to remove water or moisture from the chips (substantially all of the oil having been removed previously during the washing step), the temperature in the cyclone separator is given as about 350° F., the final exhaust gases have a temperature of about 325° F., and the gaseous products of combustion recycled back to the continuous centrifuge unit are indicated as having a temperature of about 250° F., considerably broader temperature ranges may be involved. Illustratively, in the embodiment of FIG. 1, the temperature inside of the cyclone separator will generally range between about 250° and 450° F., and the products of combustion returned to the continuous centrifuge or wringer will generally be at a temperature between about 220° F. and 300° F., whereas the temperature of the exhaust gases leaving the separator will generally be in the range of about 225 to 425° F.

In contrast, in the embodiment of FIG. 2, where the object is to remove both water and hydrocarbons and other oils from the chips, the temperature will generally be considerably higher. For example, within the cyclone separator the temperature will be rather carefully controlled, especially when aluminum chips are involved, but will generally be between about 900° F. and 1100° F., usually between about 950° F. and 1050° F. The temperature of the products of combustion recycled to the continuous centrifuge or wringer will generally be at a temperature within the range of about 450° F. to about 705° F., as may be readily controlled by the employment of dilution air to the extent required, whereas the temperature in the exhaust stack may range between about 1150° and 1450° F.

Due to the fact that the combustion gases conducted from the combustion chamber to the continuous centrifuge or wringer are substantially devoid of oxygen, premature ignition of the volatile gases with which they are admixed in the centrifuge is generally not a problem.

However, where cooling of these gases is required, a minimum quantity of oxygen-containing dilution air should be used or other cooling means, e.g., a heat exchanger in the conduit 168, are recommended. The maintenance of a reducing or at least non-oxidizing atmosphere is also advantageous in restricting the undesirable oxidation of the chip surfaces at the elevated temperatures involved throughout the process since the circuit is essentially closed. Although in no case should the temperature employed by any higher than required for efficient and economic operation, as will be readily understood by one skilled in the art, the temperature ranges employed in the embodiment of FIG. 2 will of necessity be considerably higher than the temperature ranges employed in the embodiment of FIG. 1 in view of the fact that, according to the process of FIG. 1, only residual water is being purged or expelled from the chips, most of the hydrocarbon and other oil having been removed in the washing step preceding entry of the chips into the process whereas, in the embodiment of FIG. 2 both water and hydrocarbon and other oils are being removed directly in the process and the hydrocarbon oils and the like available for use as fuel are employed by recycling the effluent gases back into the afterburner furnace.

The amount of residual water, plus possibly some small amount of detergent in solution, on the chips as they emerge from the continuous centrifuge or wringer unit in the embodiment of FIG. 1 is generally about two percent (2%) by weight whereas, according to the embodiment of FIG. 2, the amount of water and hydrocarbon and other oils remaining on the chips upon their exit from the continuous centrifuge unit will be in approximately the same range but with a very considerably higher proportion of oil to total residual liquid in contrast to the insignificant amount of oil which remains on the chips upon exit from the continuous centrifuge or wringer unit when operating according to the process of the embodiment of FIG. 1.

Thus, according to the invention, a novel process for the production of dry metal chips by the removal of fluid therefrom is provided whereby dry chips can be obtained either from cleaned or uncleaned starting metal chips, the apparatus and method employed in the separation unit being by itself novel and valuable and the apparatus and process as employed in the separation unit, in combination with the apparatus and process as employed in the continuous centrifuge unit, with communicating interconnections, being all the more industrially advantageous and valuable, since none of the possibly available fuel carried by or on said starting chips is wasted, being rather employed by means of communication and recirculation means as described in the foregoing to minimzie the amount of new energy which must be provided in the process for the effective drying of the starting metal chips of whatever nature and with whatever contaminants might be present. As far as the apparatus of the invention, the apparatus involved in the separation unit of the invention constitutes an entirely new and novel approach to the drying of metal chips and, while independendtly valuable, is of course of even greater industrial value and advantage in combination with the continuous centrifuge unit, with which it is connected according to the invention by various communicating cycling and recycling conduit circuitry for purposes of obtaining the maximum possible energy and heat for drying of the chips and for purging liquid from the chips themselves while minimizing the input of new energy into the process. Accordingly, both the apparatus and the process of the present invention constitute an important and advantageous step forward in the art of providing dry metal chips, especially scrap metal chips, for reuse and reintroduction into the stream of commerce.

Whereas, in this specification and claims, reference is frequently made to "metal chips", this is to be understood as encompassing metal chips of various almost unlimited proportions, configurations, and dimensions, but particularly to include small pieces and/or particles, likewise of extremely variable dimensions, and in general the term "metal chips" is employed herein as having the usual meaning to one skilled in the art, being inclusive not only of parts, pieces, particles, and fragments of the usual type from scrap, but also previously unused metal in standard or odd configurations remaining from previous molding, extruding, casting, rolling, or like metal processing operations, and it goes without saying that inconveniently large pieces can be reduced in size in any convenient manner and employed as metal chips and that, accordingly, any suitable metal, whether scrap or otherwise, can be converted into chips and employed in the process and apparatus of the invention, whether new metal or previously used metal, including even and especially new and used aluminum sheet and can scrap, when it is determined that such further processing into new metal is required or desired by the operator, provided, however, that in all cases such metal scraps are of suitably small dimensions so that they can be employed efficiently in the separator unit and/or continuous centrifuge or wringer unit according to the invention without causing damage to or plugging of the apparatus employed, this ordinarily being taken care of according to the skill of the art by preshredding the chips to suitable manageable and utilizable dimensions.

It is thereby seen from the foregoing that the objects of the present invention have been accomplished and that a novel, efficient, and economic process for the drying of metal chips has been provided, as well as novel apparatus for use in carrying out the said process, and whereby all of the previously-mentioned advantages have been attained and the shortcomings of the prior art have been obviated.

Although the preferred embodiments of the invention have been illustrated in the accompanying drawings and described in the foregoing description, it is to be understood that the invention is not limited to the embodiments disclosed or to the exact details of operation or exact compounds, compositions, methods, or procedures shown and described, since the invention is capable of numerous modifications, rearrangements, and substitutions of parts and elements and other equivalents, whether metallurgical, chemical, or mechanical, without departing from the spirit or scope of the invention, as will readily be apparent to one skilled in the art, wherefore the present invention is to be understood as limited only by the full scope which can be legally accorded the appended claims.

We claim:

1. In a metal chip drying apparatus, the combination comprising
   cyclone separator means having a wall, said wall being of heat-conducting material and having inner and outer surfaces, and having inlet means for the entry into said cyclone separator means of gas-entrained metal chips, outlet means for the exit of dried chips from said cyclone separator means, outlet means at the opposite end of said cyclone separator means for the exit of exhaust gases therefrom, combustion chamber means about the outer surface of the wall of said cyclone separator means for the combustion of fuel therein, inlet means into said combustion chamber means for the entry of heat and flame thereinto, burner means associated with said inlet means into said combustion chamber means and with fuel source means, and outlet means for exit of gaseous products of combustion from said combustion chamber means.

2. The combination of claim 1, additionally comprising water-jacket means about said combustion chamber means having cold-water inlet means and hot-water outlet means.

3. The combination of claim 1, also comprising continuous centrifuge means including chip inlet means and discharge outlet means for exit of gas-entrained chips from said centrifuge means, together with associated conduit means, which associated conduit means is connected from said discharge outlet means to said inlet means into said cyclone separator means.

4. The combination of claim 3, also comprising conduit means associated with said combustion chamber outlet means and in communication with said chip inlet means of said continuous centrifuge means, thereby forming a circuit between said combustion chamber means through said outlet means thereof and continuous centrifuge means via said chip inlet means of said continuous centrifuge means and thence out of said continuous centrifuge means via said discharge outlet means thereof and associated conduit means into said cyclone separator means via said inlet means thereof.

5. The combination of claim 4, also comprising rotary airlock means ahead of said chip inlet means into said continuous centrifuge means.

6. The combination of claim 5, also comprising automatic self-unloading solids separator means at a point in said circuit between said rotary airlock means and said chip inlet means of said continuous centrifuge means.

7. The combination of claim 4, also comprising water-jacket means about said combustion chamber means having cold-water inlet means and hot-water outlet means.

8. The combination of claim 5, also comprising rotary airlock means downstream from said dry chip outlet means of said cyclone separator means.

9. The combination of claim 1, wherein the said combustion chamber means is a part of afterburner furnace means and including return conduit means for conducting exhaust gases from said outlet means of said cyclone separator means into said combustion chamber means.

10. The combination of claim 4, wherein said combustion chamber means is a part of afterburner furnace means and including return conduit means for conducting exhaust gases from said outlet means of said cyclone separator means into said combustion chamber means.

11. The combination of claim 10, also comprising rotary airlock means ahead of said chip inlet means of said continuous centrifuge means and also comprising rotary airlock means down stream from said chip outlet means of said cyclone separator means.

12. The combination of claim 11, also comprising automatic self-unloading solids separator means in said circuit between said rotary airlock means located ahead of said chip inlet means of said continuous centrifuge means and said chip inlet means.

13. A process for the production of dry metal chips by the removal of fluid therefrom comprising the following steps:

entraining fluid-containing metal chips in a gas, providing a cyclone separator having a wall, said wall being of heat-conductive material and comprising internal and external surfaces, applying heat to a substantial portion of the external surface of said wall of said cyclone separator to produce a fluid-vaporizing temperature on the internal surface of said wall, introducing said gas with entrained fluid-containing chips into said cyclone separator, causing said fluid-containing chips to contact the internal surface of said heated wall of said cyclone separator thereby purging and vaporizing fluid from said chips, exhausting hot gases including entrained vaporized fluid purged from said chips from one end of said cyclone separator, and exiting dried metal chips from the other end of said cyclone separator.

14. The process of claim 13, wherein said fluid-containing metal chips are moisture-containing metal chips.

15. The process of claim 13, wherein said fluid-containing metal chips are oil-containing metal chips.

16. The process of claim 13, wherein said metal chips are moisture-containing metal chips and wherein the internal surface of said wall of said cyclone separator is heated to a temperature sufficient to vaporize said moisture, and including the step of exhausting gases including entrained vaporized moisture from said chips at one end of said cyclone separator.

17. The process of claim 13, wherein said metal chips are oil-containing metal chips and wherein the internal surface of said wall of said cyclone separator is heated to a temperature sufficient to vaporize said oil, and including the step of exhausting gases including entrained vaporized oil from said chips at one end of said cyclone separator.

18. The process of claim 16, wherein the internal surface of the wall of the cyclone separator is heated to a temperature between about 250° and about 450° F.

19. The process of claim 17, wherein the internal surface of the wall of the cyclone separator is heated to a temperature between about 900° and about 1100° F.

20. The process of claim 13, wherein said heating of the exterior surface of the wall of the said cyclone separator is effected by combustion in a combustion chamber surrounding said cyclone separator.

21. The process of claim 20, wherein said combustion is in a combustion chamber which is a part of an afterburner furnace.

22. The process of claim 21, wherein said afterburner furnace is fueled at least in part by exhaust gases including entrained vaporized oil purged from said chips in said cyclone separator and including the step of conducting said exhaust gases to said afterburner furnace.

23. The process of claim 20, comprising the step of providing a water-jacket surrounding said combustion chamber for purposes of heating water in said water-jacket and conducting said heated water to a chip-washing step at or near the beginning of the process.

24. The process of claim 16, wherein extractable fluid is removed from the starting metal chips centrifugally in a continuous centrifuge before introduction of the gas containing entrained chips into the cyclone separator, and wherein gas entraining said metal chips from said continous centrifuge is conducted from said continuous centrifuge into said cyclone separator.

25. The process of claim 17, wherein extractable fluid is removed from the starting metal chips centrifugally in a continuous centrifuge before introduction of the gas containing entrained chips into the cyclone separator, and wherein gas entraining said metal chips from said continuous centrifuge is conducted from said continuous centrifuge into said cyclone separator.

26. The process of claim 25, including the step of utilizing the combustion of exhaust gases including entrained vaporized oil purged from said chips for heating of said wall of said cyclone separator.

27. The process of claim 24, including the step of exhausting gaseous products of combustion from said combustion chamber and conducting the same to and introducing the same into said continuous centrifuge for the heating and entrainment of starting metal chips therein.

28. The process of claim 25, including the step of exhausting gaseous products of combustion from said combustion chamber and conducting the same to and introducing the same into said continuous centrifuge for the heating and entrainment of starting metal chips therein.

29. The process of claim 27, wherein the temperature of the gaseous products of combustion conducted to said continuous centrifuge from said centrifugal separator is between about 220° and about 300° F.

30. The process of claim 28, wherein the temperature of the gaseous products of combustion conducted to said continuous centrifuge from said centrifugal separator is between about 450° and about 750° F.

31. A process for the production of dry metal chips by the removal of fluid therefrom comprising the following steps:

entraining fluid-containing metal chips in a gas,
providing a cyclone separator having a wall, said wall comprising internal and external surfaces,
heating a substantial portion of said wall of said cyclone separator to fluid-vaporizing temperature,
introducing said gas with entrained fluid-containing chips into said cyclone separator,
causing said fluid-containing chips to contact the internal surface of said heated wall of said cyclone separator thereby
purging and vaporizing fluid from said chips,
exhausting hot gases including entrained vaporized fluid purged from said chips from one end of said cyclone separator, and
exiting dried metal chips from the other end of said cyclone separator,
heating said wall of said cyclone separator to fluid-vaporizing temperature by effecting combustion in a combustion chamber surrounding said wall of said cyclone separator,
conducting the hot gaseous products of combustion from said combustion chamber to and introducing them into a continuous centrifuge,
extracting extractable fluid from starting metal chips centrifugally in said continuous centrifuge,
entraining said metal chips in said hot gaseous products of combustion introduced into said continuous centrifuge from said combustion chamber, and
conducting said gaseous products with entrained chips from said continuous centrifuge to and introducing the same into said cyclone separator, thereby providing an essentially closed system.

32. The process of claim 31, wherein said chips contain oil and wherein said combustion chamber is a part of an afterburner furnace and wherein the hot gases include entrained vaporized oil and are exhausted from said cyclone separator and recycled back and employed as fuel for said combustion chamber of said afterburner furnace.

33. The process of claim 31, wherein the process is conducted in an essentially non-oxidizing atmosphere.

34. The process of claim 32, wherein the process is conducted in an essentially non-oxidizing atmosphere.

* * * * *

UNITED STATES PATENT AND TRADEMARK OFFICE
CERTIFICATE OF CORRECTION

PATENT NO.  : 4,710,126

DATED       : December 1, 1987

INVENTOR(S) : Larry D. Areaux and Robert H. Dudley

It is certified that error appears in the above-identified patent and that said Letters Patent is hereby corrected as shown below:

Col. 1, line 30; "hydrcarbon" should read -- hydrocarbon --
Col. 1, line 30; "cuttingoil" should read -- cutting-oil --
Col. 4, line 47; after "afterburner", insert -- furnace --
Col. 7, line 55; "preferably" should read -- preferable --
Col. 8, line 60; "705°" should read -- 750° --
Col. 9, line 54; "minimzie" should read -- minimize --
Col. 9, line 61; "independendtly" should read -- independently --
Col. 13, line 8; "continous" should read -- continuous --

Signed and Sealed this

Twelfth Day of July, 1988

Attest:

DONALD J. QUIGG

*Attesting Officer*      *Commissioner of Patents and Trademarks*